Sept. 25, 1928.
W. GEIST
1,685,741
CANDY PULLING MACHINE
Filed Aug. 22, 1925
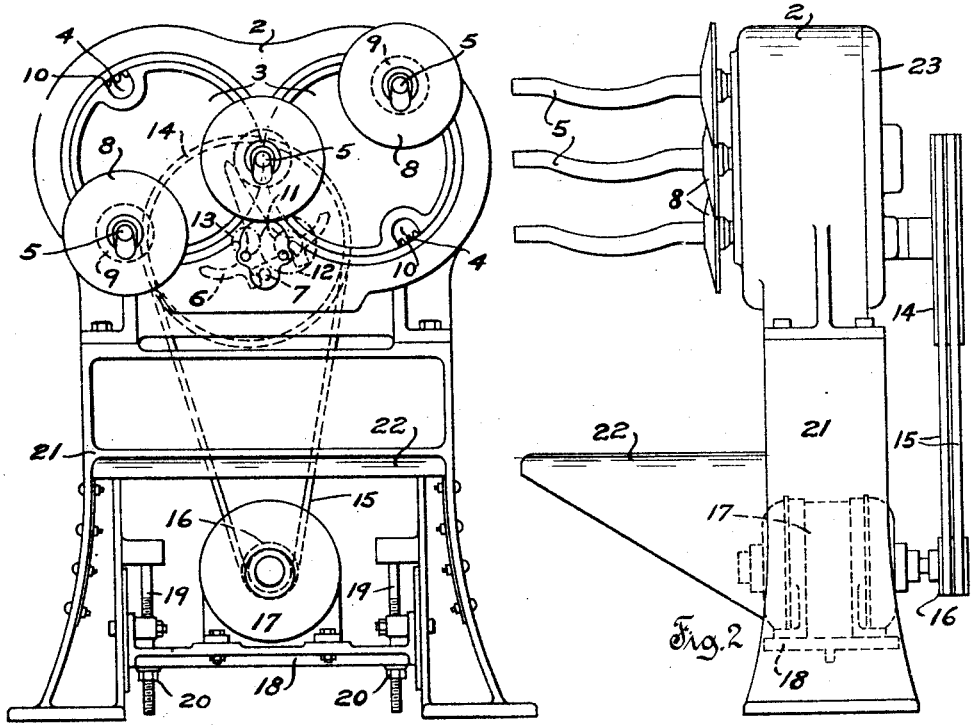
Fig. 1   Fig. 2
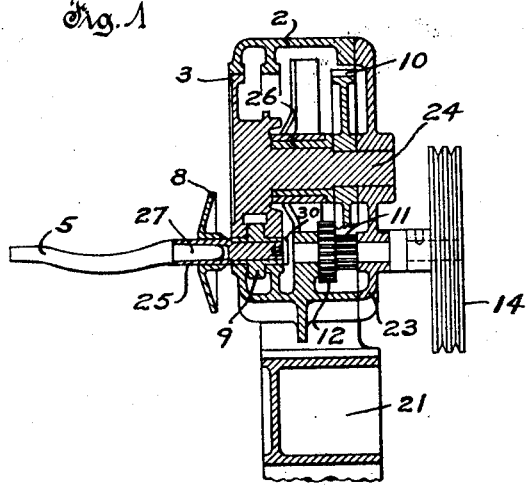 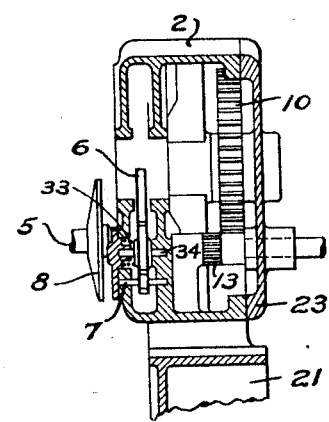
Fig. 3   Fig. 4
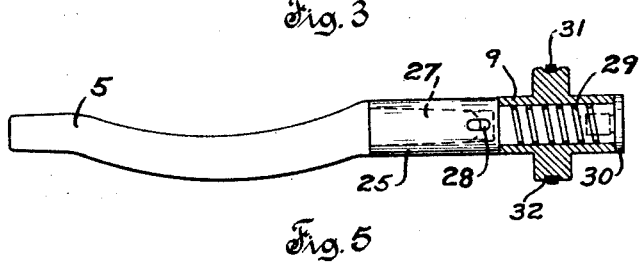
Fig. 5
Inventor
W. Geist
by G. A. DeVries
Attorney Patented Sept. 25, 1928.

1,685,741

UNITED STATES PATENT OFFICE.

WALTER GEIST, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CANDY-PULLING MACHINE.

Application filed August 22, 1925. Serial No. 51,796.

This invention relates in general to improvements in the art of conditioning viscous pliable substances, and relates more specifically to improvements in the construction and operation of machines for pulling and otherwise working candy stock or the like.

A general object of the invention is to provide improved mechanism for conditioning viscous pliable material such as candy stock.

Some of the more specific objects and advantages accruing from the invention, are as follows:—

To provide a candy pulling machine which is simple and compact in construction, and which is highly efficient in operation.

To provide candy stock conditioning mechanism of the floating pin type, which is conveniently accessible for operation and in which the operating mechanism is effectively protected against ingress of candy stock and other undesirable substances.

To provide machines for working viscous substances, all parts of which are readily accessible for inspection, and the various elements of which may be quickly assembled and dismantled.

To provide improved driving mechanism especially applicable to candy pulling machines and the like, which may be readily adjusted to maintain maximum efficiency and which can be effectively lubricated.

To provide improved pin and pin transferring structure for candy stock working machines of the floating pin type.

To provide a machine for treating edible substances, which is sanitary in structure and which is relatively noiseless in operation.

To provide other improvements in the construction and operation of candy pulling machines or the like, which will reduce the cost of construction to a minimum and which will enhance to a maximum the efficiency of operation.

A clear conception of embodiments of the several features of the invention and of the operation of mechanism constructed in accordance therewith, may be had by referring to the drawing accompanying and forming a part of this specification in which like reference characters designate the same or similar parts in the various views.

Fig. 1, is a front elevation of an improved candy pulling machine.

Fig. 2, is a side elevation of the improved candy pulling machine.

Fig. 3, is a fragmentary vertical section taken transversely through one of the pin driving disks of the improved candy pulling machine.

Fig. 4, is a fragmentary vertical section taken transversely through the center of one of the improved candy pulling machines.

Fig. 5, is an enlarged part sectional view of one of the pins of the improved candy pulling machine.

By referring to the drawing, it will be noted that the improved machine specifically illustrated, comprises generally a disk support or upper casing 2 having a pair of laterally spaced bearings 26 formed integral therewith and located entirely therewithin; a pair of parallel horizontal main shafts 24 rotatably supported in the bearings 26 within the casing 2; a peripherally notched disk 3, formed integral with the forward end of each of the shafts 24 and having peripheral engagement with openings in the front of the casing 2; three floating pins 5 associated with the peripheral notches 4 of the disks 3; a base 21 forming a support for the casing 2 and for a working table 22 disposed in front of the machine; a prime mover illustrated as an electric motor 17 adjustably associated directly with the base 21; and a train of gearing connecting the motor 17 with the rear portions of the shafts 24.

The upper casing 2 besides providing bearings for the shafts 24 and for the disks 3, has adjoining rear openings of sufficient size to permit withdrawal therethrough of the spur gears 10 which are secured to the shafts 24 directly adjacent to the bearings 26. A rear cover 23 encloses the rear portion of the casing 2 and provides end bearings for the shafts 24, this cover also providing bearings for other transmission gearing.

The pins 5 have tapered ends 27 which frictionally engage sockets in the pin supports 25, and the pins may be removed from the supports by means of a drift pin insertible in the holes 28. The supports 25 have reduced end portions rotatably fitting the bores of rollers 9 as shown in Fig. 5, The reduced end portions of the supports 25 may be provided with lubricant retaining helical grooves 29 and the rollers 9 are retained upon the supports by means of screw threaded caps 30. The rollers 9 have medial portions of enlarged diameter and have end portions of smaller diameter which are engageable with the notches 4 of the disks 3. The enlarged medial portions of the rollers are formed for engagement with a transferring tumbler 6 as shown in Fig. 1, the tumbler 6 being formed to automatically transfer the successive advancing pins 5 from the notches 4 of one disk 3 to the cooperating notches of the other. The tumbler 6 is supported upon a pivot 34 and is oscillatable about this pivot, the degree of movement of the tumbler 6 being limited by a stop pin 7 which is engageable with lower abutments formed on the tumbler 6. A helical spring 33 engages the surface of the tumbler 6 and surrounds the pivot 34 thereof, this spring serving to frictionally retain the tumbler 6 in any predetermined position until the same is positively shifted by an advancing roller 9. The medial enlarged portion of each roller may also be provided with an annular recess having chamfered side portions 32 and having a rubber or other elastic band 31 located within the recess between the chamfered portions 32 thereof.

The pins 5 project away from the disks 3 and are overhung with respect to these disks, extending horizontally over the table 22. Embracing each pin support 25 adjacent to the end of the corresponding pin 5, is a circular guard plate 8 having a frusto-conical outer surface. These plates extend laterally away from the rear ends of the pin 5 and a considerable distance over the adjacent faces of disks 3 and of the front face of the upper casing 2. As shown, the plates 8 are freely rotatable upon the supports 25 and may be freely removed.

The spur gears 10 secured to the shafts 24 are in mesh with each other and one of these spur gears 10 meshes directly with a pinion 11 secured to a counter shaft to which a transmission gear 12 is also secured. By virtue of this arrangement, the gears 10 and hence the disks 3 are rotatable in opposite directions. The transmission gear 12 meshes with a driving pinion 13 which is secured to a counter shaft the rear end of which projects beyond the cover 23 and is drivingly connected to a grooved sheave 14. The sheave 14 is drivingly connected to a sheave 16 by means of a plurality of independent V-belts or bands 15 which are formed of flexible or resilient material such as reenforced rubber. The driving sheave 16 is secured directly to the shaft of the driving motor 17 which is supported within the base 21 upon an adjustable base plate 18. The base plate 18 is guided upon the side walls of the base 21 and has openings therein which are penetrated by vertical threaded rods 19 secured at their upper ends to lugs formed integral with the base 21. Nuts 20 co-act with the lower threading portions of the rods 19 and permit vertical adjustment of the motor base 18 and of the motor 17 to vary the tension on the driving bands 15.

During normal operation of the candy pulling machine, the motor 17 is transmitting continuous opposite rotary motion to the disks 3 through the sheave 16, bands 15, sheave 14, pinion 13, gear 12, pinion 11 and gears 10. As the disks 3 revolve, the pins 5 associated with the peripheral notches 4, are caused to travel about the axes of rotation of the disks 3. When the pins 5 approach the tumbler 6, they are automatically transferred from the notch 4 of one disk 3 to the cooperating notch 4 of the other disk as indicated in Fig. 1. The transferred pin is then urged about the axes of the right hand disk 3 to which it has been transferred and eventually strikes the laterally projecting lower arm of the tumbler 6 which is located in its path of movement, and throws the tumbler 6 to its extreme opposite position where it is held by the spring 33. The tumbler 6 is then in a position to transfer the next approaching pin 5 from the right hand disk to the other disk. In this manner the successive pins 5 are transferred from one disk to the other and are carried about the disk axes in a figure 8 course. The candy stock which is to be treated is placed upon the projecting moving pins above the table 22, and is pulled and worked in such a manner that air will be effectively embedded in the stock and will produce a desired change in the color and condition thereof. After the candy stock has been properly conditioned, the machine may be stopped and the stock removed from the pins thus placing the machine in condition for the reception of a fresh batch of stock.

During such operation of the machine the guard plates 8 effectively prevent candy stock from entering the notches 4 and the bearing surfaces between the disks 3 and the casing 2. The pins 5 may be withdrawn from the supports 25 for the purpose of cleaning the same or otherwise, by insertion of a drift pin in the holes 28. The supports 25 may be removed upon removal of the rear cover 23 and of the retaining caps 30, and the entire machine may be readily disassembled by removal of the cover 23 and of the spur gears 10 from the main supporting shafts 24.

By providing the soft rubber bands 31 on the enlarged medial portions of the rollers 9, these bands will effectively cushion the rollers 9 as they strike the tumbler 6 at high speed, and will eliminate noise. As considerable pressure exists between the roller 9 and the transferring surface of the tumbler 6, the bands upon striking the tumbler 6 will be spread laterally and will be gradually compressed into the chamfered portions 32 of the peripheral roller grooves, thus gradually permitting the metallic peripheral surfaces of the rollers 9 to engage the transferring surface of the tumbler 6. The helical compression spring 33 effectively retains the tumbler 6 in adjusted position without undesirably retarding switching thereof by the advancing rollers 9. The use of the flexible band drive also tends to eliminate noise, besides providing an extremely efficient mechanism for transmitting motion from the motor 17 to the propelling disks 3.

By arranging the motor 17 within the base 21, this motor is effectively protected against damages. The weight of the motor 17 and of the base 18 is utilized to produce the proper tension of the driving bands 15. If greater tension is desired the nuts 20 cooperating with the rods 19 may be lowered, whereas, the tension may be reduced by raising the nuts 20 in an obvious manner. The rear cover 23 besides permitting convenient assembling and dismantling of the machine, permits effective lubrication of all of the bearings without danger of having the lubricant escape and come in contact with the stock being treated. The grooves 29 on the supports 25 may be filled with grease thus permitting free rotation of the pins 5 with respect to the rollers 9.

It should be understood that it is not desired to limit the invention to the exact details of construction and operation herein shown and described, for various modifications within the scope of the claims may occur to persons skilled in the art.

It is claimed and desired to secure by Letters Patent:—

1. In combination, a pair of rotary disks, a roller movable by and periodically transferable from one of said disks to the other, a support rotatably associated with said roller, and a pin secured to said support, said pin being freely endwise removable from said support.

2. In combination, a pair of rotary disks, a roller movable by and periodically transferable from one of said disks to the other, a support rotatably associated with said roller, and a pin secured to said support, said pin having a tapered shank frictionally engaging a socket in said support to permit free endwise removal of said pin from said support.

3. In combination, a pair of rotary disks, a roller movable by and periodically transferable from one of said disks to the other, a support carried by said roller, and a pin carried by said support, said pin being freely removable from said support.

4. In combination, a pair of rotary disks, a roller movable by and periodically transferable from one of said disks to the other, a socketed member rotatably supported in said roller, and a pin frictionally engaging the socket of said member.

5. In combination, a pair of rotary disks, a roller movable by said disks, a tumbler for periodically transferring said roller from one of said disks to the other, a resilient pad carried by said roller and distortable during operation to permit direct contact between said roller and said tumbler adjacent to said pad, and a pin associated with said roller.

6. In combination, a pair of rotary disks, a roller movable by said disks, a tumbler for periodically transferring said roller from one of said disks to the other, said roller having a peripheral groove therein, a resilient band disposed within said groove, and a pin associated with said roller.

7. In combination, a pair of rotary disks having peripheral notches, a roller having portions of reduced diameter cooperable with said notches, a tumbler cooperable with the medial portion of said roller to periodically transfer said roller from one of said disks to the other, a rubber band carried by said medial roller portion and distortable to permit metallic contact between said roller and said tumbler, and a pin carried by said roller.

8. In combination, a pair of rotary disks, a roller movable by and periodically transferable from one of said disks to the other, a support rotatably associated with said roller, and a pin carried by said support, said support having a spiral lubricant retaining groove at the surface of coaction with said roller.

9. In combination, a pair of rotary disks, a roller movable by and periodically transferable from one of said disks to the other, a support rotatably associated with said roller, a pin carried by said support, and means for positively preventing endwise displacement of said roller and said support.

10. In combination, a pair of rotary disks, a roller movable by and periodically transferable from one of said disks to the other, a support rotatably associated with said roller, a guard plate freely rotatable upon said support, and a pin secured to said support.

11. In combination, a pair of rotary disks, a roller movable by and periodically transferable from one of said disks to the other, a support rotatably associated with said roller, a guard plate freely rotatable upon said support, and a pin secured to said support, both said pin and said guard plate being freely endwise removable from said support.

12. In combination, a pair of rotary disks, a roller movable by and periodically transferable from one of said disks to the other, a support rotatably associated with said roller, a guard plate freely rotatable upon an outer surface of said support, and a pin detachably associated with an internal surface of said support.

13. In combination, a pair of rotary disks, a roller movable by and periodically transferable from one of said disks to the other, a support rotatably associated with said roller, a guard plate rotatably associated with said support, and a pin secured to said support, said support having a socket and an outer surface surrounding said socket, and said pin and guard plate coacting with said socket and said surface respectively.

14. In combination, a pair of rotary disks, a roller movable by and periodically transferable from one of said disks to the other, a support carried by said roller, a guard plate freely rotatable upon said support, and a curved pin detachably secured to said support.

In testimony whereof, the signature of the inventor is affixed hereto.

WALTER GEIST.